(12) United States Patent
Goldman et al.

(10) Patent No.: US 7,589,663 B1
(45) Date of Patent: Sep. 15, 2009

(54) SYSTEM AND METHOD FOR THE MEASUREMENT OF THE UNAMBIGUOUS ROLL ANGLE OF A PROJECTILE

(75) Inventors: Geoffrey H. Goldman, Ellicott City, MD (US); William O. Coburn, Dumfries, VA (US); Thomas J. Pizzillo, Colesvlle, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 196 days.

(21) Appl. No.: 11/335,678

(22) Filed: Jan. 20, 2006

(51) Int. Cl.
*G01S 13/66* (2006.01)
*G01C 1/00* (2006.01)
*G01S 13/00* (2006.01)
*F42B 30/00* (2006.01)

(52) U.S. Cl. ............... 342/62; 342/5; 342/61; 342/175; 342/188; 342/195; 244/3.1; 244/3.11; 244/3.14; 244/3.15; 244/3.23

(58) Field of Classification Search ........... 244/3.1–3.3; 342/52–58, 60–62, 175, 188, 194–197, 430, 342/5–11; 89/6.5, 1.11
See application file for complete search history.

(56) References Cited

U.S. PATENT DOCUMENTS

| | | | | |
|---|---|---|---|---|
| 4,347,996 A | * | 9/1982 | Grosso | 244/3.16 |
| 5,039,029 A | * | 8/1991 | Taylor et al. | 244/3.11 |
| 5,163,637 A | * | 11/1992 | Hansen | 244/3.21 |
| 5,218,361 A | * | 6/1993 | Avila et al. | 342/430 |
| 5,233,901 A | * | 8/1993 | Nilsson et al. | 89/6.5 |
| 5,259,567 A | * | 11/1993 | Jano et al. | 244/3.11 |
| 5,398,032 A | | 3/1995 | Tucker et al. | 342/9 |
| 5,414,430 A | * | 5/1995 | Hansen | 342/188 |
| 5,490,643 A | * | 2/1996 | Jano et al. | 244/3.11 |
| 5,661,555 A | * | 8/1997 | Romer et al. | 244/3.13 |
| 6,016,990 A | * | 1/2000 | Small | 244/3.11 |
| 6,098,547 A | * | 8/2000 | West | 244/3.14 |
| 6,307,514 B1 | * | 10/2001 | West | 244/3.19 |
| 6,450,442 B1 | * | 9/2002 | Schneider et al. | 244/3.14 |

(Continued)

FOREIGN PATENT DOCUMENTS

FR 2436433 A1 * 4/1980

*Primary Examiner*—Bernarr E Gregory
(74) *Attorney, Agent, or Firm*—Edward L. Stolarun; Lawrence E. Anderson

(57) ABSTRACT

A system for the measurement of an angle of roll of a projectile is disclosed. The projectile has a casing with a rear end, a front end, and a side wall extending therebetween. The system includes a radar configured to transmit a polarized electromagnetic signal toward the projectile and a groove disposed on the side wall of the casing. The groove has a width, a depth, and a length, the width extending along a longitudinal axis of the projectile, the depth extending inwardly from an outer surface of the casing toward the longitudinal axis, and the length extending along the outside of the casing. The radar is further configured to receive a return signal from the projectile, wherein the return signal from the groove is modulated as a function of the angle of roll of the projectile. Amplitude or phase modulation of the return signal from the groove can be used to uniquely determine the roll angle of the projectile.

33 Claims, 10 Drawing Sheets

U.S. PATENT DOCUMENTS

| | | | |
|---|---|---|---|
| 6,483,455 B2 * | 11/2002 | Fleury et al. | 342/62 |
| 6,572,052 B1 * | 6/2003 | Hansen | 244/3.11 |
| 6,727,843 B1 * | 4/2004 | Hansen | 342/62 |
| 7,023,380 B2 * | 4/2006 | Schneider | 244/3.11 |
| 2005/0184192 A1 * | 8/2005 | Schneider | 244/3.1 |

* cited by examiner

SYSTEM AND METHOD FOR THE MEASUREMENT OF THE UNAMBIGUOUS ROLL ANGLE OF A PROJECTILE

GOVERNMENT INTEREST

The invention described herein may be manufactured, used, and licensed by or for the United States Government.

BACKGROUND a. Technical Field

The present disclosure generally relates to systems and methods for measuring the unambiguous roll angle of a projectile.

b. Description of the Related Art

Various approaches exist for determining the roll angle of a projectile using polarized radiation. For example, U.S. Pat. No. 5,039,029 describes an approach where a monitor determines, from the ground, the orientation (roll and attitude) of a missile by observing the character of a signal transmitted therefrom. By transmitting a linearly-polarized signal to a ground receiver, the missile identifies a given plane fixed with respect to the body frame of the missile. The plane is identified at the ground receiver by comparing the ratio of the signal received in any two cross-polarized directions. To resolve the attendant 180° ambiguity, the monitor employs an antenna array disposed on the missile that is switchable, back-and-forth, between two equal power lobes. The monitor operates with a single transmitter, and the lobe structure of the transmitted signal is obtained using a linearly-polarized antenna array with electronic phase switching between the aforementioned equal power lobes. This approach requires that the projectile contain a transmitter, therefore creating additional costs and requiring valuable space on the projectile.

Another approach for determining the roll angle of a projectile using polarized radiation is disclosed and described in U.S. Pat. No. 5,414,430. The system described therein includes a transmitter for emitting position-determining polarized radiation (space wave) in the direction of the projectile, and a receiver arranged in the projectile for receiving the emitted radiation. The emitted space wave is composed of a carrier wave reference with frequency $f_1$, which has been phase-modulated with a modulation frequency $f_2$, wherein $f_2 < f_1$ and wherein $f_2$ forms a submultiple of the carrier wave frequency $f_1$. Similar to the approach in U.S. Pat. No. 5,039,029, this approach requires that the projectile contain a transmitter.

Yet another approach for determining the roll angle of a projectile is to use polarization-sensitive reflectors. U.S. Pat. No. 5,490,643 describes a system including an optical device located in the rear of a projectile, the optical device having a retro-reflector fitted with a polarizer and, at the projectile firing station, a light source whose beam illuminates the rear of the projectile. A light flux analyzer deduces the roll angle of the projectile from the direction of polarization of the light-flux reflected by the projectile. The polarizer has a refraction index discontinuity positioned on the rear of the projectile, before the retro-reflector, with an angle of inclination between the direction normal to its plane of index variation and the longitudinal axis of the projectile and chosen to be greater than the Brewster angle. The light source is laterally offset laterally with respect to the firing axis of the projectile. These two measurements give rise to a modulation of intensity of the reflected light beam as a function of the roll angle plus or minus $2\pi$, which gives, to two successive maximum values of the signal of the analyzer, different amplitudes that enable the signals to be differentiated, and therefore make it possible to remove the ambiguity of $\pi$ resulting from the measurement of the direction of polarization. This approach requires space on the end of the projectile. For some missiles, rockets, and artillery pieces, there is no space available on the back of the projectile for the polarization-sensitive reflectors. For example, for some missiles, the end of the missile is occupied by motor components. As well, exhaust plumes may mask the end of the projectile.

U.S. Pat. No. 6,483,455 discloses a device for the unambiguous measurement of the angle of roll of a projectile. The system includes a radar equipped with means for processing and sending a signal to the casing of the projectile in at least one direction of incident polarization, and a set of parallel grooves made on the casing, the depth of which is modulated dissymmetrically with respect to the axis of symmetry of the projectile. The axis of symmetry of the projectile does not pass through the point of the antenna of the radar where the antenna beam is generated. The processing means analyze, in reception, a signal that is back-scattered by the casing of the projectile, the signal being modulated as a function of the angle of roll of the projectile. The modulation has two maximum local values corresponding to two angular roll positions of the projectile when the polarization is parallel to the grooves. The processing means removes the 180° ambiguity by comparing the levels of the local maximum values. Again, this approach requires space on the end of the projectile for the placement of the grooves. As previously noted, space is not always available at the end of a projectile.

Therefore, there is a need for improved systems and methods that address these and other shortcomings of the prior art.

SUMMARY

Briefly described, systems and methods for determining the unambiguous roll angle of a projectile are disclosed. A representative embodiment of a system for the measurement of an angle of roll of a projectile, the projectile having a casing with a rear end, a front end, and a side wall extending therebetween, includes a radar transmitter configured to transmit a polarized electromagnetic signal toward the projectile. A groove is disposed on the side wall of the casing, the groove having a width, a depth, and a length, the width extending along a longitudinal axis of the projectile, the depth extending inwardly from an outer surface of the casing toward the longitudinal axis, and the length extending along the outside of the casing. The system also includes a radar receiver configured to receive a return signal from the projectile. The amplitude of the return signal from the groove is varied as a function of the angle of roll of the projectile.

Another embodiment of the present disclosure provides a method of measuring an angle of roll of a projectile, the projectile having a casing with a rear end, a front end, and a side wall therebetween. The method includes forming a groove having a width, a depth, and a length on the side wall of the projectile, the width extending parallel to a longitudinal axis of the projectile, the depth extending inwardly from an exterior of the casing toward the longitudinal axis, and the length extending along the exterior of the casing perpendicularly to the width. The method further includes transmitting a polarized electromagnetic signal toward the projectile, the projectile having a radar signature that varies with the angle of roll of the projectile.

Yet another embodiment of the present disclosure relates to a system for the measurement of an angle of roll of a projectile, the projectile having a casing with a rear end, a front end, and a side wall extending therebetween. The system includes a radar transmitter configured to transmit a polarized electromagnetic signal toward the projectile and a groove disposed on a cylindrical portion of the side wall of the casing. The groove has a width, a depth, and a length, the width extending along a longitudinal axis of the projectile, the depth extending inwardly from an outer surface of the casing toward the longitudinal axis, and the length extending along the outside of the casing. A radar receiver is configured to receive a return signal from the projectile, the relative phase of the return signal from the groove being modulated as a function of the angle of roll of the projectile. The system further includes processing means for analyzing the modulated return signal, the processing means determining the angle of roll by determining a modulating effect of the groove on the return signal.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The foregoing description has been presented for purposes of illustration and description. It is not intended to be exhaustive or to limit the present disclosure to the precise forms disclosed. Modifications and/or variations are possible in light of the above teachings. The embodiments discussed, however, were chosen and described to illustrate the principles of the present disclosure and its practical application to thereby enable a person having ordinary skill in the art to utilize the present disclosure and various embodiments and with various modifications as are suited to the particular use contemplated. All such modifications and/or variations are within the scope of the present disclosure as determined by the appended claims when interpreted in accordance with the breadth to which they are fairly and legally entitled.

Disclosed herein are systems, apparatuses, and methods to which an angle of roll of a projectile can be measured. In particular, the angle of roll of the projectile can be measured using radar that is configured to transmit an electromagnetic signal toward the projectile and receive a return signal from the projectile. The projectile has a roll-angle groove exposed on a side wall of a casing of the projectile. The electromagnetic signal that is transmitted by the radar reflects off of the roll-angle groove of the projectile, which provides a return signal received by the radar. The roll rate and the unambiguous roll angle can be determined from the amplitude modulation and/or phase modulation of a radar return signal scattered by the groove. The roll rate and the unambiguous roll angle can be used to initiate an action on the projectile that requires knowledge of these parameters through a wireless communication link on the projectile. For example, the projectile can have a thruster on the side wall of the projectile to steer the projectile to an intended target based on the determined roll rate and unambiguous roll angle. Example systems are first discussed with reference figures. After the exemplary systems have been described, examples of the operation of the system are provided to explain the manner in which the angle of roll of the projectile can be measured.

Figure 1:
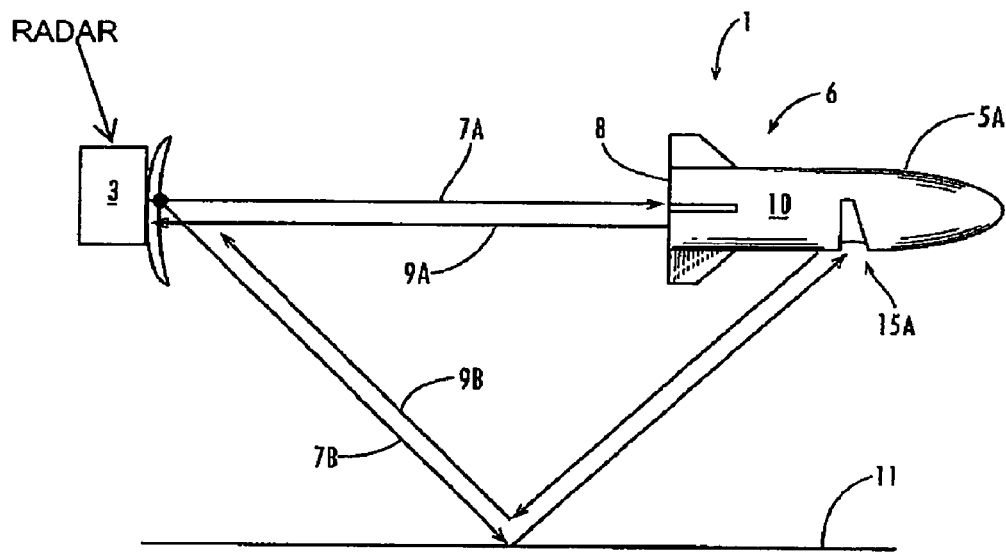
FIG. 1 is a perspective view of an embodiment of a system that measures an angle of roll of a projectile.

Referring now in more detail to the figures in which like reference numerals identify corresponding parts, FIG. 1 is a perspective view of an embodiment of a system that measures an angle of roll of a projectile. The system 1 includes a projectile 5A and radar 3. The projectile 5A includes a roll-angle groove 15A disposed on a casing 10 of the projectile 5A, which is further described in relation to FIGS. 3-4. The projectile launch device (not shown) is displaced from the location of the radar 3. The radar 3 transmits electromagnetic signal 7A-B, preferably polarized, to the projectile 5A. Because of the close proximity of the surface to the radar 3 and the projectile 5A, the transmitted electromagnetic signal 7A-B reaches the projectile 5A in multiple paths. For example, the electromagnetic signal 7A reaches the back 8 of the rear end 6 of the projectile 5A. The electromagnetic signal 7A hits the back 8 of the projectile 5A and bounces back a return signal 9A to the radar 3. The electromagnetic signal 7B also travels on another path that bounces off a surface 11, such as ground or water, then off the roll-angle groove 15A of the projectile 5A. The electromagnetic signal 7B returns back to the surface 11 then to the radar 3 as return signal 9B. The radar 3 calculates the amplitude modulation based on the return signal 9A and 9B, which can be used to determine the roll rate and is used to determine the unambiguous roll angle of the projectile 5A.

Figure 2:
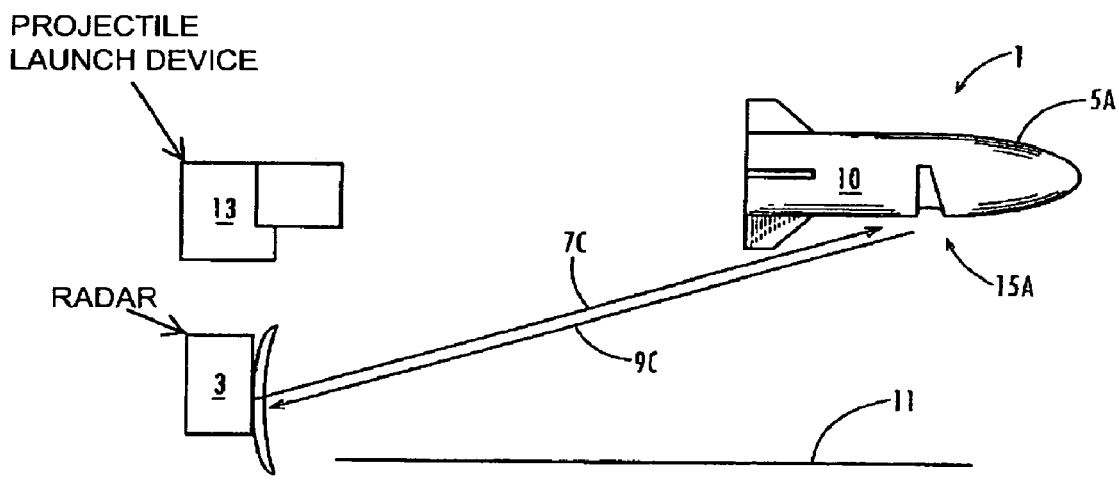
FIG. 2 is a perspective view of an embodiment of a system that measures an angle of roll of a projectile.

FIG. 2 is a system view of the radar measurement of unambiguous projectile roll angle using a roll-angle groove 15A. The system 1 includes radar 3, a projectile 5A, and a projectile launch device 13. The projectile 5A is similar to the projectile mentioned with reference to FIG. 1 having a roll-angle groove 15A on the casing 10 of the projectile 5A. The projectile 5A is launched by the projectile launch device 13 at a displacement from the surface 11. The radar 3 is positioned below the projectile launch device 13 and near the surface 11. The radar 3 transmits an electromagnetic signal 7C to the projectile 5A, which the electromagnetic signal reflects off the roll-angle groove 15A of the projectile 5A producing a return signal 9C to the radar 3. The return signal 9C that is reflected off the roll-angle groove 15A of the projectile 5A enables the system 1 to determine the roll rate and the unambiguous roll angle using the amplitude modulation of the return signal 9C.

It should be noted that although FIGS. 1 and 2 show the projectile launch device 13 being parallel to the surface 11, the system can be employed where the projectile launch device 13 is not parallel to the surface 11 as the projectile launch device 13 travels to its target. In general, the system can be employed as long as the groove or grooves is intermittently shadowed from the radar signal as the projectile rotates.

Figure 3:
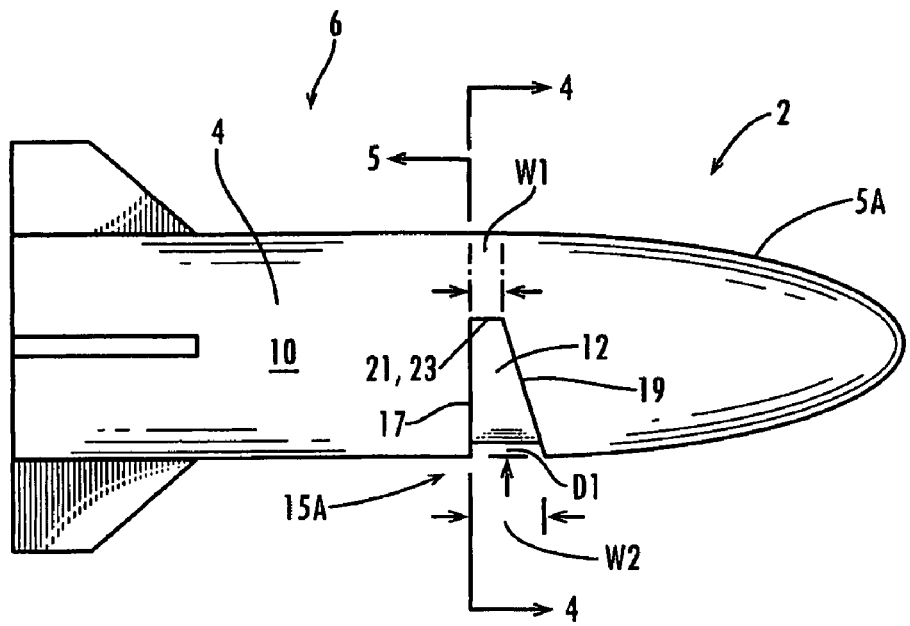
FIG. 3 is a side view of an embodiment of a roll-angle groove on the projectile shown in FIG. 1.

FIG. 3 is a side view of the projectile 5A shown in FIG. 1. The projectile 5A includes a casing 10 with rear end 6, a front end 2, and a side wall 4 extending therebetween. The projectile 5A further includes a roll-angle groove 15A that has a varying width W1, W2 and a constant depth D1. The roll-angle groove 15A is disposed on the side wall 4 of the casing 10. The roll-angle groove 15A can be located anywhere on the side wall 4 of the casing 10. Preferably, the roll-angle groove 15A is located substantially at the center of the length of the projectile 5A. The roll-angle groove 15A includes a pair of opposed sides 17, 19 and a pair of opposed ends 21, 23. The roll-angle groove 15A has a first width W1, a second width W2, a depth D1, and a length L1 in which the first width W1 and second width W2 extend along the longitudinal axis of the projectile 5A, the depth D1 extends inwardly from an outer surface of the casing 10 toward the longitudinal axis, and the length L1 extends substantially along the latitudinal axis outside of the casing 10.

The first width W1 is the distance between the opposed sides 17, 19 at each of the opposed ends 21, 23. The second width W2 is the distance between the opposed sides 17, 19 at the center of the roll-angle groove 15A. The second width W2 is greater than the first width W1, and the width of the roll-angle groove 15A increases from each end of the opposed ends 21, 23 to the center 25 (shown in FIG. 4) of the roll-angle groove 15A. The opposed side 17 of the roll-angle groove 15A is substantially perpendicular to the longitudinal axis and the opposed side 19 is in a plane that extends at an acute angle relative to the opposed side 17 of the projectile 5A. The width of the groove 15A increases monotonically, e.g., linearly, from each of the opposed ends 21, 23 to the center 25 of the roll-angle groove 15A. The depth D1 of the groove 15A is the distance between the base 12 of the groove 15A and the outside surface of the side wall 4. The varying width of the projectile 5A enables the system 1 to modulate the amplitude of the return signal 9 deflected off the roll-angle groove 15A as a function of roll angle. The return signal 9 that is deflected off the roll-angle groove 15A having the smallest amplitude modulation near the opposed ends 21, 23 and the largest amplitude modulation near the center 25 of the roll-angle groove 15A. The amplitude modulation created by the roll-angle groove 15A on the return signal 9 facilitates determining the roll rate and unambiguous roll angle of the projectile 5A. The modulation of the amplitude of the return signal 9 is further described in relation to FIG. 10.

Figure 4:
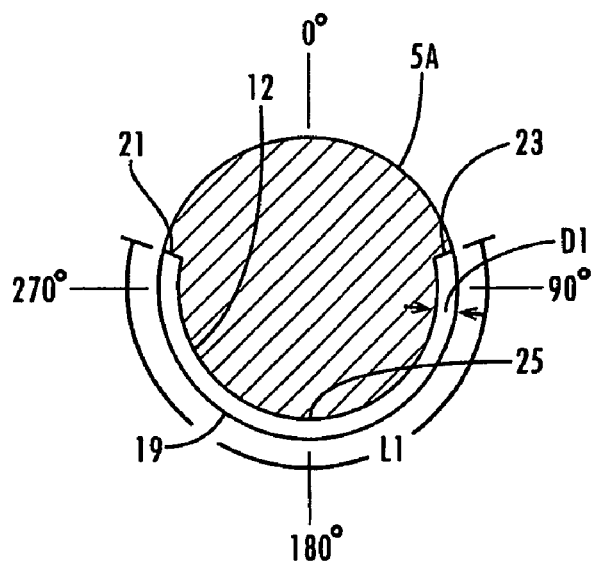
FIG. 4 is cross-sectional view indicated on line 4-4 of the projectile shown in FIG. 3.

FIG. 4 is a cross-sectional view taken along line 4-4 of the projectile 5A shown in FIG. 3. The cross-sectional view shows that the opposed end 21 of the roll-angle groove 15A is disposed substantially near the 270 degree roll angle of the projectile 5A, and the other opposed end 23 is disposed near the 90 degree roll angle. The center 25 of the roll-angle groove 15A is disposed at the 180 degree roll angle. The length L1 of the roll-angle groove 15A extends along the outside surface of the side wall 4 between the pair of opposed ends 21, 23 and across the 180 degree roll angle. The depth D1 of the roll-angle groove 15A remains constant and is measured from outside surface of the side wall 4 to the base 12 of the roll-angle groove 15A.

Figure 5:
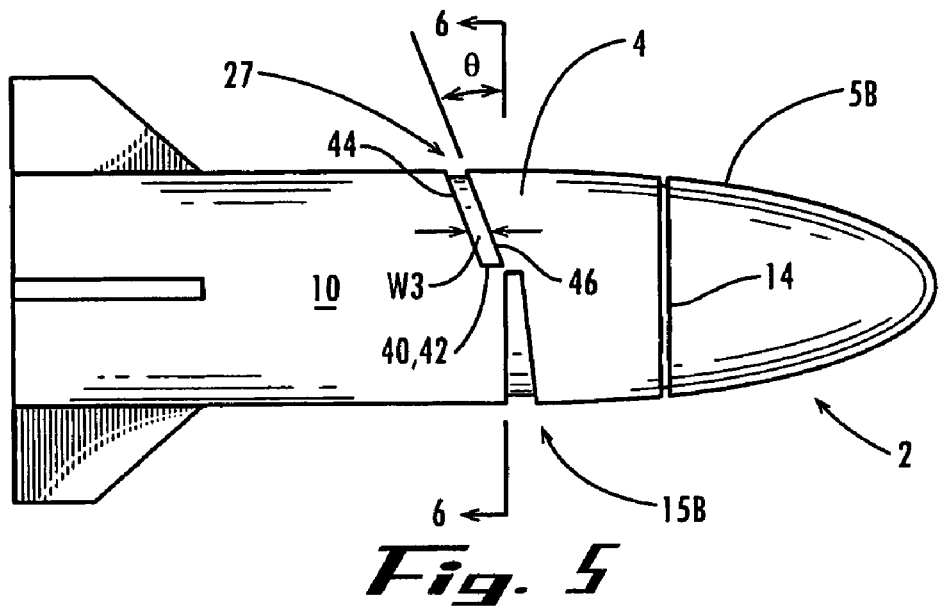
FIG. 5 is a side view of an embodiment of a deflecting groove and roll-angle groove on a projectile.

FIG. 5 is side view of an embodiment of a deflecting groove 27 and a roll-angle groove 15B on a projectile 5B. The projectile 5B is similar to the projectile 5A that is described above and therefore includes side wall 4, casing 10, and roll-angle groove 15B. The projectile 5B, however, has a crease 14 and a deflecting groove 27. The crease 14 is formed at a point at which the front end 2 is coupled to the side wall 4. The crease 14 reflects electromagnetic signal 7 from the radar 3, producing a return signal (not shown) back to the radar 3. The return signal that is deflected off the crease 14 can interfere with the return signal 9 of the roll-angle groove 15B.

Because of the interference caused from the return signal of the crease 14, the deflecting groove 27 deflects the return signal of the crease 14 away from the radar 3. The deflecting groove 27 is disposed on the side wall 4 of the casing 10 and extends at an acute angle θ, e.g., 30 degrees, relative to the latitudinal axis of the projectile 5B. The deflecting groove 27 includes a pair of opposed sides 44, 46 and a pair of opposed ends 40, 42. The deflecting groove 27 has a constant third width W3, and a constant second depth D2 (shown in FIG. 6), and a second length L2 (shown in FIG. 6) in which the third width W3 extends along the longitudinal axis of the projectile 5B. The second depth D2 extends inwardly from an outer surface of the casing 10 toward the longitudinal axis, and the second length L2 extends substantially along the latitudinal axis outside of the casing 10. The deflecting groove 27 enables the radar 3 to receive the return signal 9 from the roll-angle groove 15B with less interference caused by the return signal of the crease 14.

Figure 6:
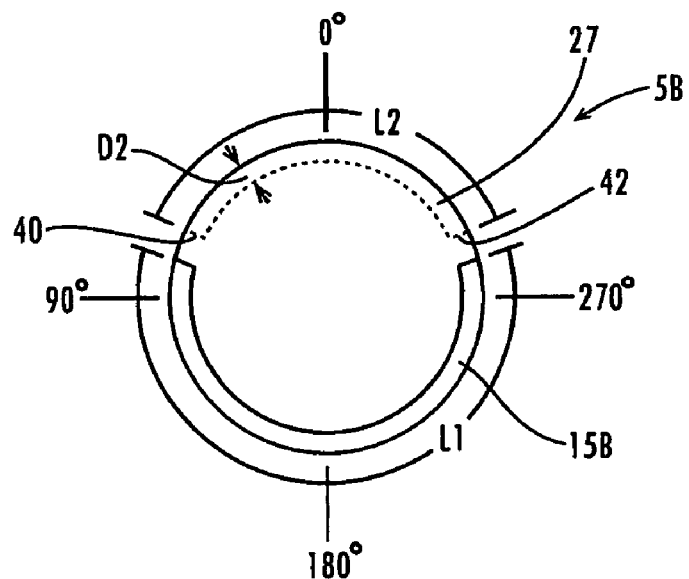
FIG. 6 is a cross-sectional view indicated on line 6-6 of the projectile shown in FIG. 5.

FIG. 6 is a cross-sectional view taken along line 6-6 of the projectile shown in FIG. 5. The projectile 5B includes the deflecting groove 27 and the roll-angle groove 15B. The first length L1 of the roll-angle groove 15B and the second length L2 of the deflecting groove 27 form a substantially closed loop along the outside casing 10 of the projectile 15B.

Figure 7:
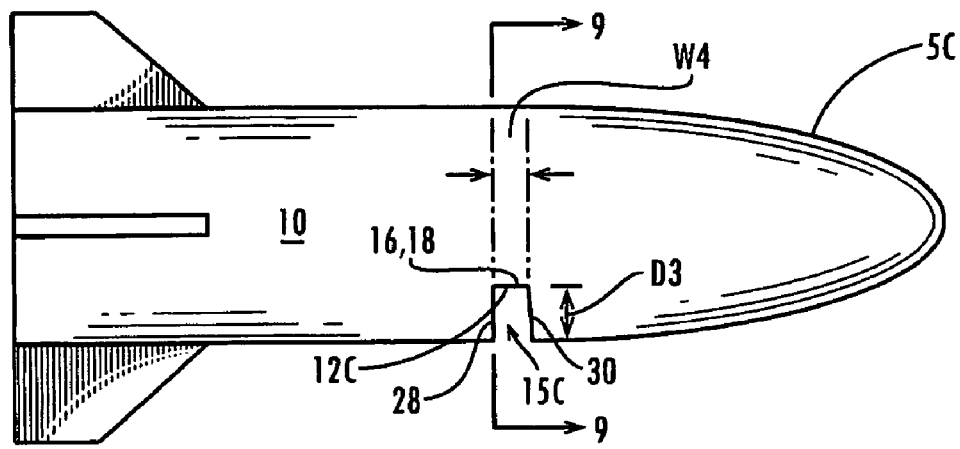
FIG. 7 is a side view of an embodiment of a roll-angle groove on a projectile.

FIG. 7 is a side view of a further embodiment of a projectile. The projectile 5C includes a roll-angle groove 15C that has a constant width W4 and a varying depth D3. The roll-angle groove 15C includes opposed ends 16, 18, opposed sides 28, 30, a depth D3, a width W4, and a length L3 (shown in FIG. 8). The width W4 is the distance between the opposed sides 28, 30, which are substantially parallel to each other such that the width W4 of the roll-angle groove 15C is constant between the opposed ends 16, 18. The depth D3 varies between the opposed ends 16, 18, and is the distance between the outside surface of the casing 10 and the base 12C of the roll-angle groove 15C. The varying depth D3 of the projectile 5C enables the system 1 to modulate the amplitude of the return signal 9 deflected off the roll-angle groove 15C. The return signal 9 that is deflected off the roll-angle groove 15C has the smallest amplitude modulation near the opposed ends 16, 18 and the largest amplitude modulation near the center 25C (shown in FIG. 8) of the roll-angle groove 15C. The amplitude modulation created by the roll-angle groove 15C on the return signal 9 facilitates determining the roll rate and unambiguous roll angle of the projectile 5C. The modulation of the amplitude of the return signal 9 is further described in relation to FIG. 10.

Figure 8:
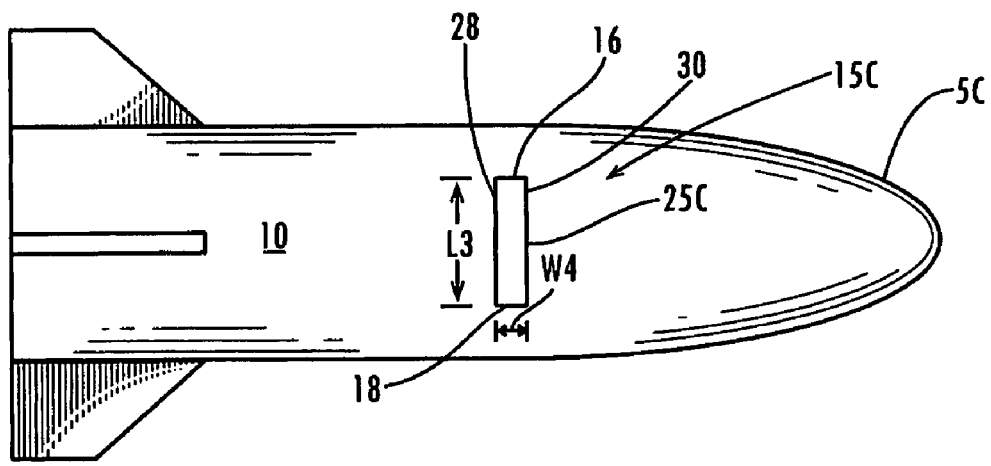
FIG. 8 is a side view of an embodiment of the projectile shown in FIG. 7.

FIG. 8 is a side view of an embodiment of the projectile shown in FIG. 7. FIG. 8 illustrates, as mentioned above with reference to FIG. 7, that the width W3 of the projectile 5C remains constant and the depth D3 varies. The depth D3 preferably increases monotonically from the opposed ends 16, 18 to the center 25C of the roll-angle groove 15C. It should be noted that the length L3 of the projectile 5C also remains constant and is the distance along the outside surface of the casing 10 between the opposed ends 16, 18.

Figure 9:
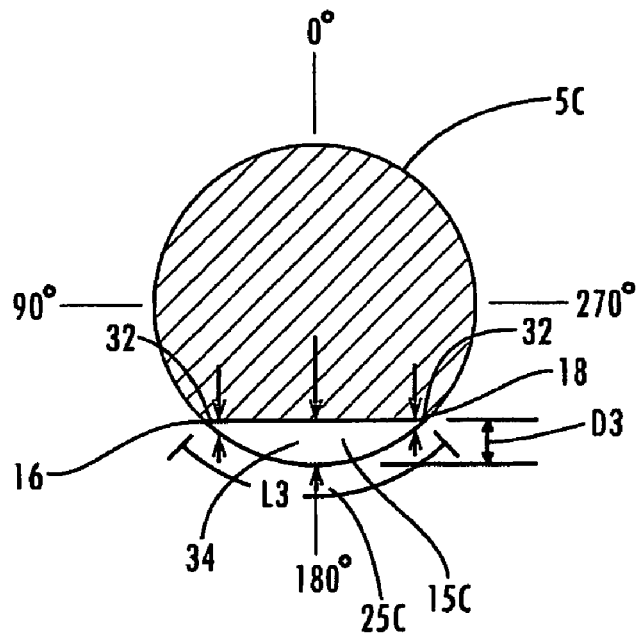
FIG. 9 is a cross-sectional view indicated on line 9-9 of the projectile shown in FIG. 7.

FIG. 9 is a cross-sectional view taken along line 9-9 of the projectile 5C shown in FIG. 8. The depth D2 of the roll-angle groove 15C includes a first depth 32 at each of the opposed ends 16, 18, and a second depth 34 at the center 25C (or 180 degree) of the roll-angle groove 15C. The second depth 34 is greater than the first depth 32, and the depth of the roll-angle groove 15C increases monotonically from each of the opposed ends 16, 18 to the center 25C.

Figure 10:
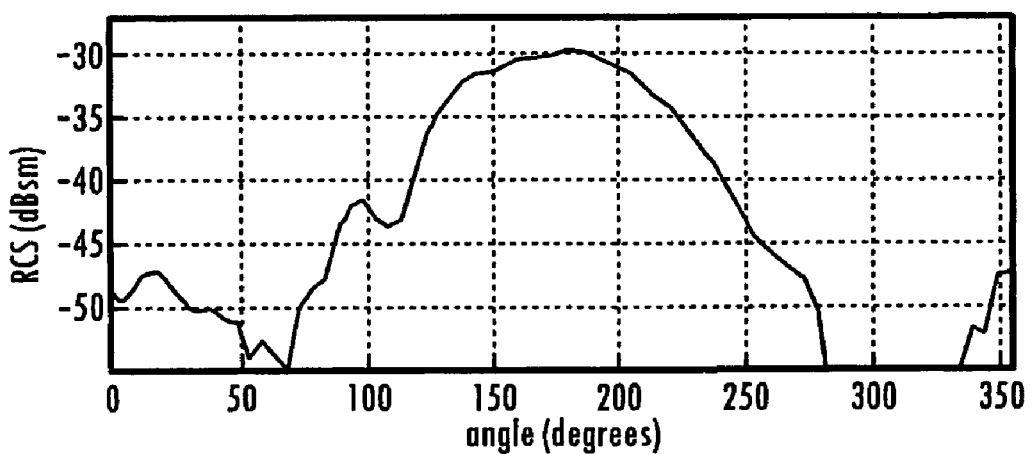
FIG. 10 shows a curve of modulation of the measured power of a return signal from a groove as a function of the roll of a projectile.

FIG. 10 shows a curve of amplitude modulation of the measured power of a return signal 9 from a roll-angle groove 15 as a function of the roll of a projectile 5. The configurations of the roll-angle grooves 15A-C are described in FIGS. 1-9. The measurements were made at ka-band for 0 degrees azimuth angle, 5 degrees elevation angle, and with vertical transmit, vertical receive polarization. The roll angles of the projectiles 5A-C can be determined from the increased radar cross section (RCS) shown near 180 degrees roll angle.

Figure 11:
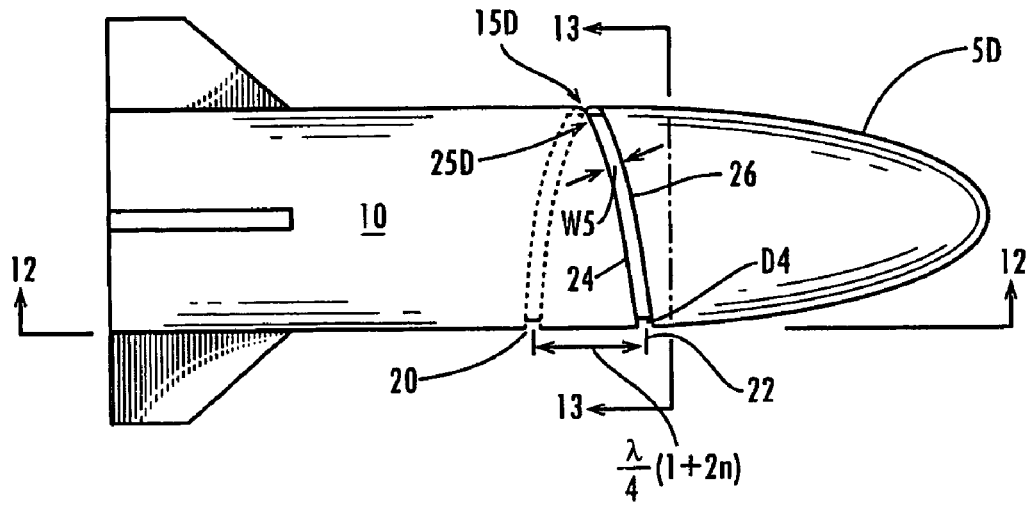
FIG. 11 is a side view of an embodiment of a threaded groove on a projectile.

FIG. 11 is a side view of a roll-angle groove on the side wall of a projectile. The roll-angle groove 15D is similar to a single turn of a thread along the outside of the casing 10, which has a first end 20 and a second end 22. The roll-angle groove 15D begins and ends at the two ends 20, 22 of the projectile 5D. The roll-angle groove 15D further includes opposed sides 24, 26 that are substantially parallel to each other. The first end 20 and the second end 22 are spaced apart from each other along the longitudinal axis of the projectile 5D and have a distance between each other that is equal to $$\frac{\lambda}{4}(1+2n)$$

where λ is the wavelength of the transmitted radar signal and n is an integer. The position of the roll-angle groove 15D relative to the longitudinal axis changes linearly as a function of roll angle, except at the first and second ends 20 and 22. The roll-angle groove 15D further includes a depth D4 that is constant and a width W5 that is constant. The return signal 9 that is deflected off the roll-angle groove 15D has the smallest phase modulation near the opposed first and second ends 20, 22, and the largest phase modulation near the center 25D of the roll-angle groove 15C. The phase modulation created by the roll-angle groove 15D on the return signal 9 facilitates determining the roll rate and unambiguous roll angle of the projectile 5D. The modulation of the phase of the return signal is further described in relation to FIG. 14.

In an alternative embodiment, the position of the roll-angle groove 15D along the longitudinal axis quadratically changes as a function of roll angle. The position of the roll-angle groove 15D relative to the longitudinal axis is $$\frac{\lambda n}{2}\left(\frac{\theta}{2\pi}\right)^2$$

for $0 \leq \theta \leq 2\pi$, where θ is the roll angle in radians and n is an integer.

Figure 12:
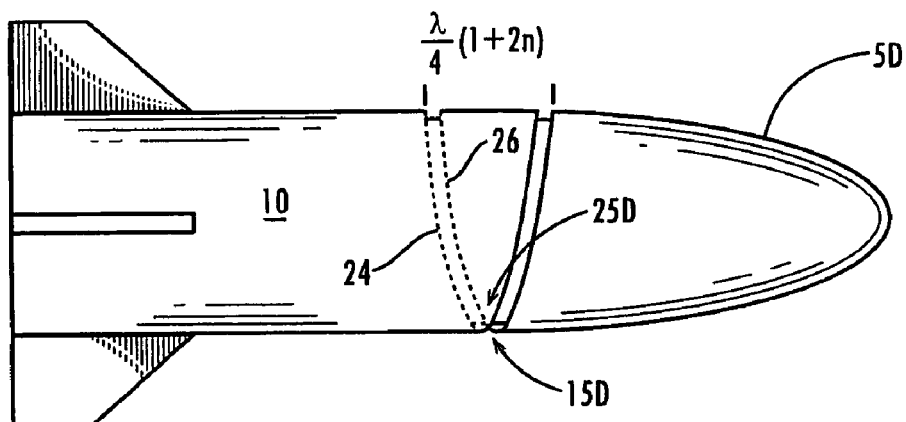
FIG. 12 is a side view of an embodiment of the projectile shown in FIG. 11.
Figure 13:
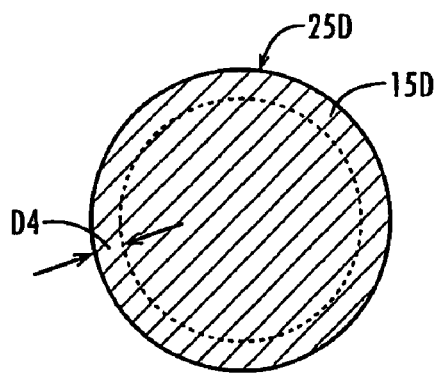
FIG. 13 is a cross-sectional view indicated on line 13-13 of the projectile shown in FIG. 11.

FIG. 12 is a side view indicated on line 12-12 of the projectile shown in FIG. 11 that is rotated 180 degrees along the roll of angle of the projectile 5D. FIG. 13 is a cross-sectional view taken along line 13-13 of the projectile 5D shown in FIG. 11 that shows the roll-angle groove 15D having a constant depth D4, the roll-angle groove 15D comprising one complete thread along the outside of the casing 10.

Figure 14:
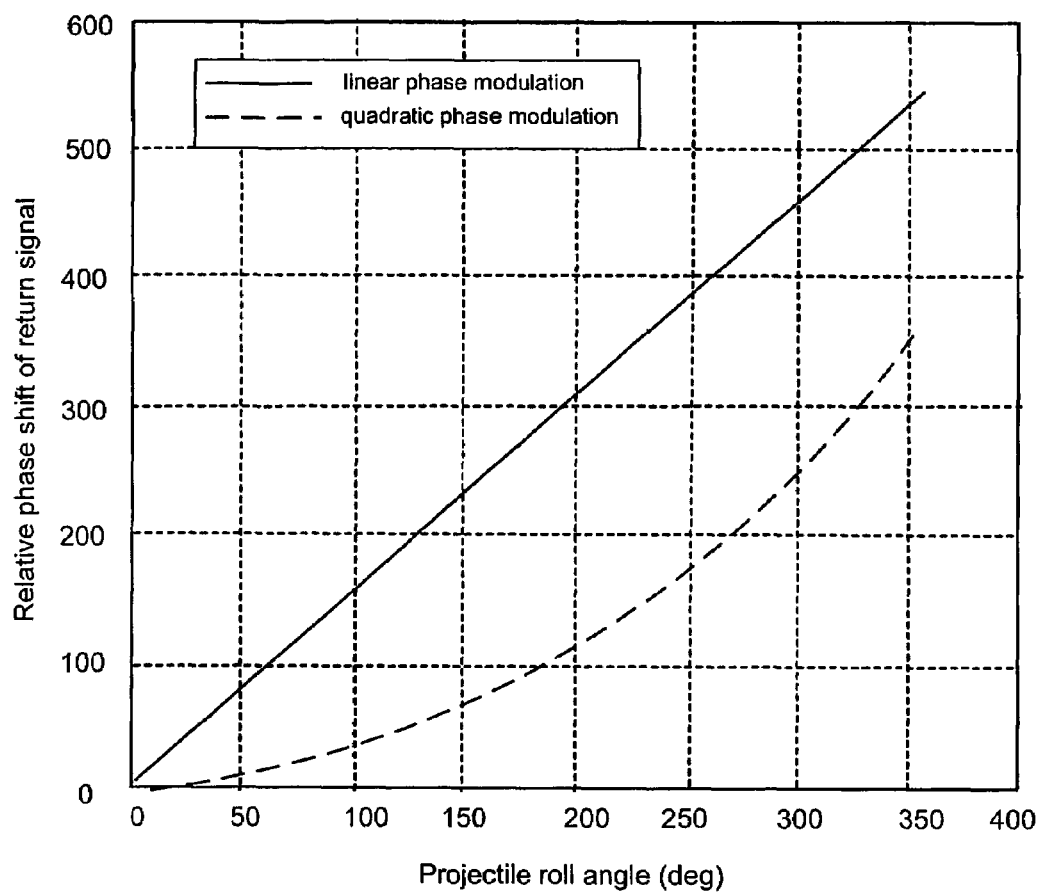
FIG. 14 shows curves simulating the effects of linearly and quadratically varying the location of the groove on the phase shift of the return signal as a function of the roll of a projectile.

FIG. 14 shows a simulation of the relative phase shift of the return signal from a thread with a linear and a quadratic spacing as a function of the roll of a projectile. A roll angle can be determined for a linear phase modulation technique from a 180-degree phase shift discontinuity after each 360-degree rotation of the projectile 5D. The roll angle can be determined for a quadratic modulation technique from a varying slope of a curve as a function of roll angle. These techniques can be modified for a particular projectile of interest. For example, if a projectile had a known stable scattering center associated with it, then the linear phase modulation technique could be employed with a phase shift discontinuity at 360 degrees roll angle. The phase angle corresponding to the groove could then be computed relative to the phase of the stable scattering center.

Figure 15:
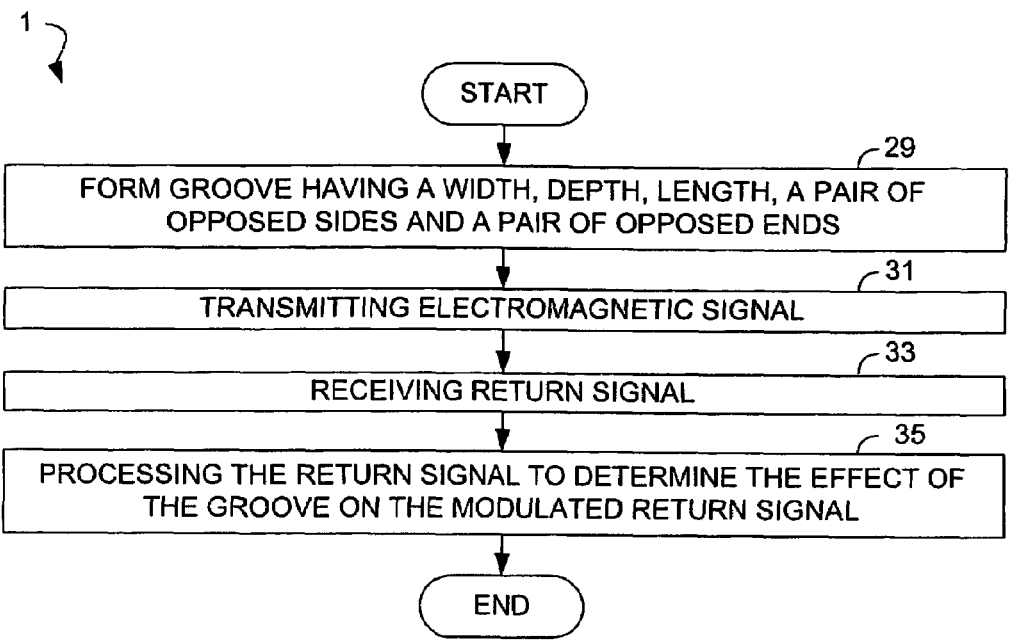
FIG. 15 is a flow diagram that illustrates an embodiment of measuring an angle roll of a projectile having a casing with a rear end, a front end, and a side wall therebetween.

FIG. 15 is a flow diagram that illustrates a method of measuring an angle of roll of a projectile having a casing 10 with a rear end 6, a front end 2, and a side wall 4 therebetween. Beginning with block 29, the method for measuring angle of roll of the projectile 5 includes forming a roll-angle groove 15 having a width, a depth, and a length on the side wall 4 of the projectile 5. The width extends parallel to a longitudinal axis of the projectile 5. The depth extends inwardly from an exterior of the casing toward longitudinal axis. The length extends along the exterior of the casing toward the latitudinal axis of the projectile 5. The roll-angle groove 15 further has a pair of opposed sides and a pair of opposed ends.

In block 31, the method includes transmitting a polarized electromagnetic signal 7 toward the projectile 5. The projectile 5 has a radar signature that varies with the angle of roll of the projectile 5. In block 33, receiving a signal from the projectile 5 in which the return signal 9 is modulated by at least a portion of the projectile 5 on which the roll-angle groove 15 is exposed. In block 35, the return signal 9 is processed to determine the effect of the roll-angle groove 15 on the modulated return signal 9.

Figure 16:
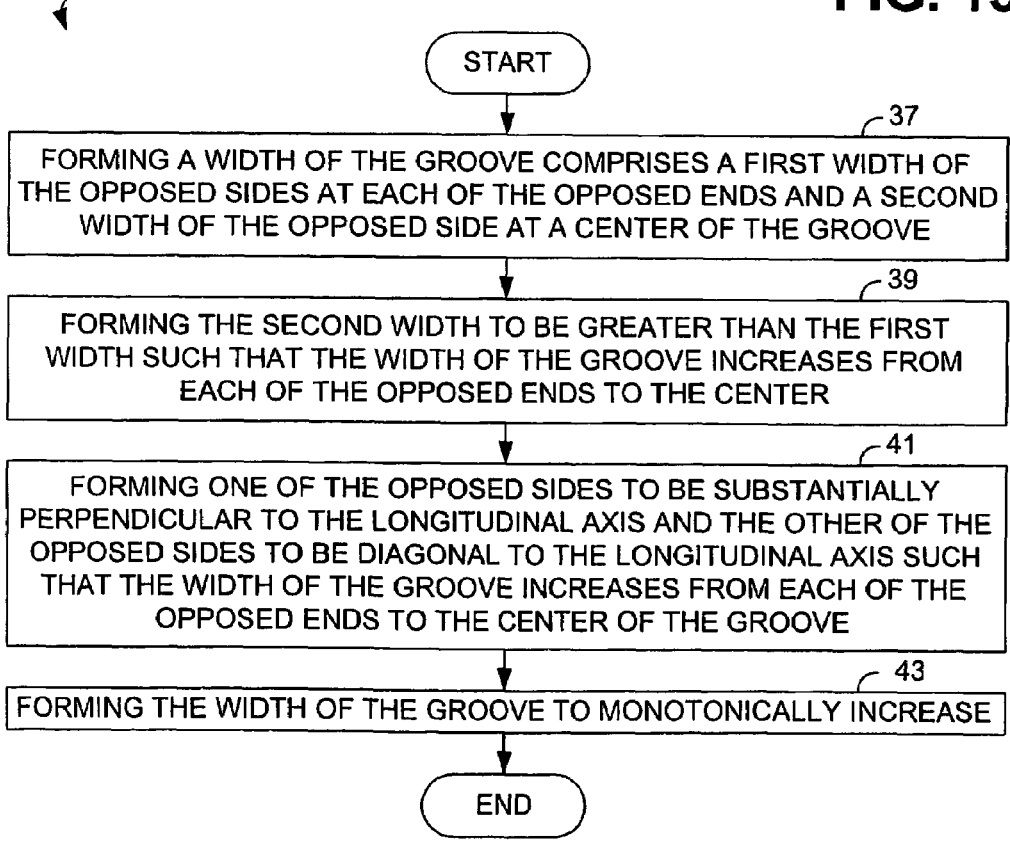
FIG. 16 is a flow diagram that illustrates an embodiment of the forming step 29 shown in FIG. 15.

FIG. 16 is a flow diagram that includes additional steps for block 29 of FIG. 15. Beginning with block 37, the forming step 29 of the system 1 further includes forming a width of the roll-angle groove 15 having a first width defined by the opposed sides at each of the opposed ends and a second width defined by the opposed sides at the center of the roll-angle groove 15. In block 39, the second width is formed to be greater than the first width such that the width of the roll-angle groove 15 increases from each of the opposed ends to the center. In block 41, one of the opposed sides extends substantially along the latitudinal axis of the projectile 5, and the other of the opposed sides extends in a direction diagonal to the latitudinal axis such that the width of the roll-angle groove 15 increases from each of the opposed ends to the center of the roll-angle groove 15. In block 43, the width of the roll-angle groove 15 is formed to linearly increase monotonically.

Figure 17:
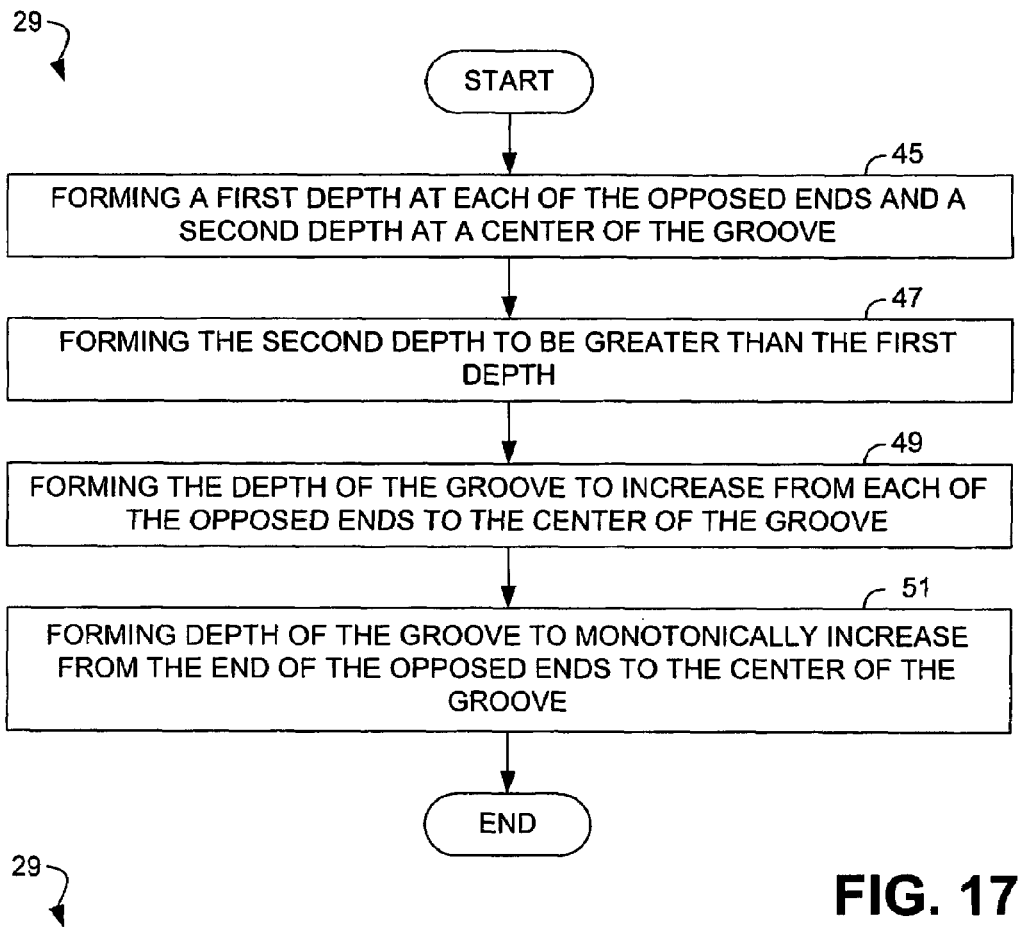
FIG. 17 is a flow diagram that illustrates an embodiment of the forming step 29 shown in FIG. 15.

FIG. 17 is a flow diagram that includes additional steps for the forming step of block 29 in the system 1 shown in FIG. 15. Beginning with block 45, the forming step 29 further includes forming a first depth at each of the opposed ends and a second depth at the center of the roll-angle groove 15. In block 47, the second depth is formed to be greater than the first depth. In block 49, the depth of the roll-angle groove 15 increases from each of the opposed ends to the center of the roll-angle groove 15. In block 51, the depth of the roll-angle groove 15 is formed to monotonically increase from the each of the opposed ends to the center of the roll-angle groove 15.

Figure 18:
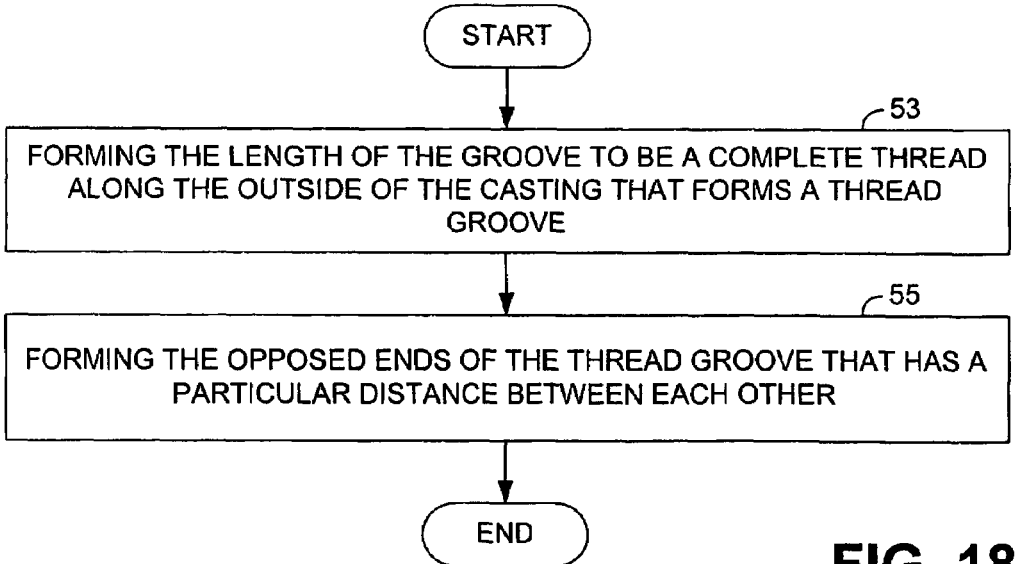
FIG. 18 is a flow diagram that illustrates an embodiment of the forming step 29 shown in FIG. 15.

FIG. 18 is a flow diagram that includes additional steps for the forming step 29 of the system 1 as shown in FIG. 15. Beginning with block 53, the forming step 29 further includes forming the length of the roll-angle groove 15 to be similar to one complete thread along the outside of the casing. In block 55, the opposed ends of the thread groove are separated by a distance equal to $$\frac{\lambda}{4}(1+2n),$$

where λ is the wavelength of the transmitted radar signal, and n is an integer.

Figure 19:
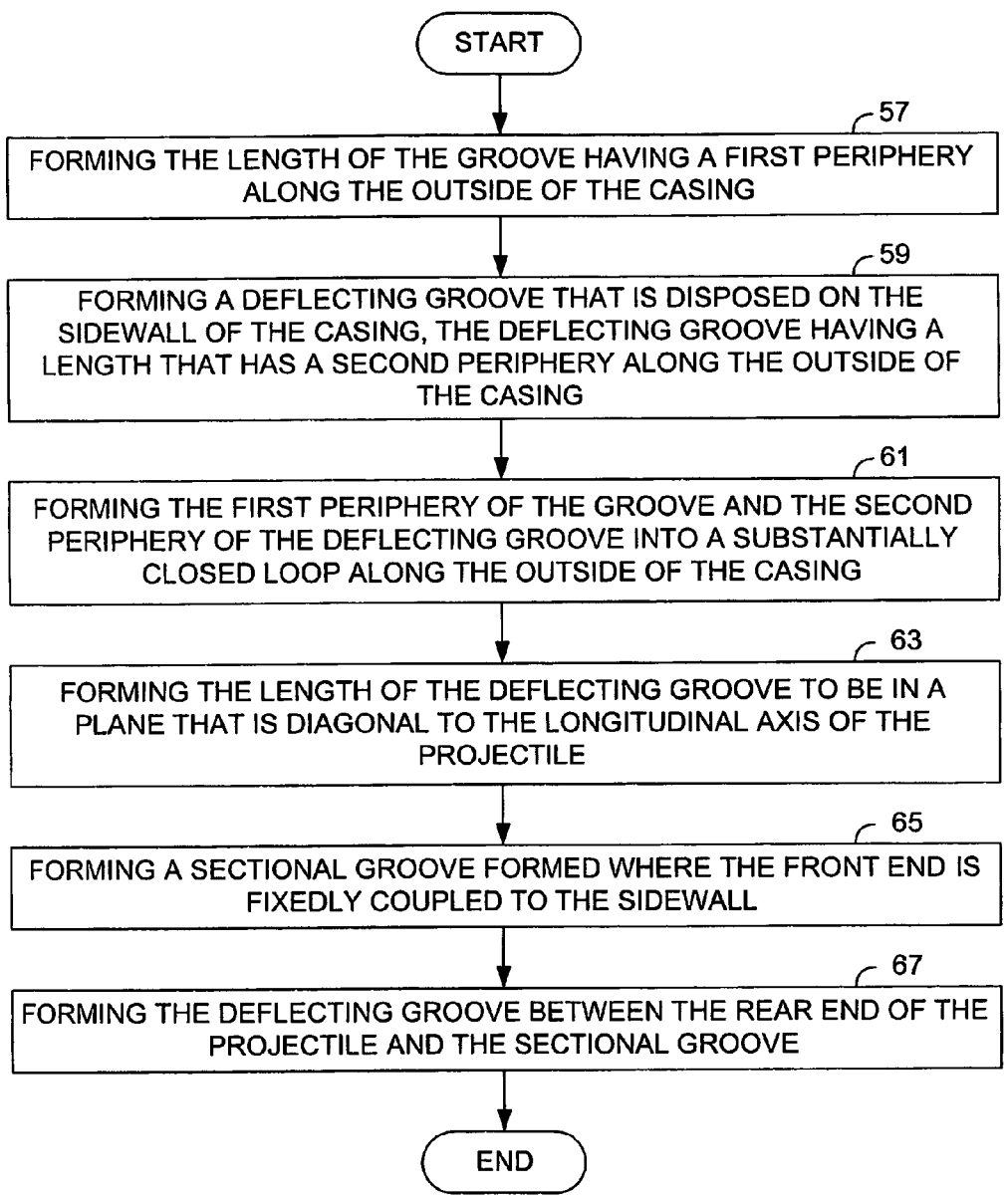
FIG. 19 is a flow diagram that illustrates an embodiment of the forming step 29 shown in FIG. 15.

FIG. 19 is a flow diagram that further explains the forming step 29 of the system 1 as shown in FIG. 15. Beginning with block 57, the forming step 29 further includes forming the length of the roll-angle groove 15 having a first length along the outside of the casing. In block 59, the forming step 29 further includes forming a deflecting groove 27 that is disposed on the side wall of the casing. In block 61, the first length of the roll-angle groove 15 and the second length of the deflecting groove 27 is formed into a substantially closed loop along the outside of the casing. In block 63, the length of the deflecting groove is formed to lie in a plane that is diagonal to the latitudinal axis of the projectile 5. In block 65, a sectional groove or crease 14 is formed where the front end is fixedly coupled to the side wall of the projectile 5. In block 67, the deflecting groove is formed between the rear end of the projectile and the sectional groove.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A projectile comprising:
    a casing with a rear end, a front end, and a side wall extending between the rear and front ends; and
    a roll-angle groove for tracking the roll angle of the projectile disposed on the side wall of the casing, the roll-angle groove having a width, a depth, and a length, the width extending along a longitudinal axis of the projectile, the depth extending inwardly from an outer surface of the casing toward the longitudinal axis, and the length extending along the outside of the casing.

2. The projectile of claim 1, wherein the length of the roll-angle groove extends in a plane that is perpendicular to the longitudinal axis.

3. The projectile of claim 2, wherein the roll-angle groove further comprises a pair of opposed sides and a pair of opposed ends.

4. The projectile of claim 3, wherein the depth of the roll-angle groove is constant.

5. The projectile of claim 4, wherein the width of the roll-angle groove comprises a first width between the opposed sides at each of the opposed ends and a second width between the opposed sides at a center of the roll-angle groove.

6. The projectile of claim 5, wherein the second width is greater than the first width and the width of the roll-angle groove increases from each of the opposed ends to the center.

7. The projectile of claim 6, wherein a first opposed side is substantially perpendicular to the longitudinal axis and a second opposed side is in a plane that extends at an acute angle relative to the first opposed side such that the width of the roll-angle groove increases from each of the opposed ends to the center of the roll-angle groove.

8. The projectile of claim 6, wherein the increase in the width of the roll-angle groove is monotonic.

9. The projectile of claim 3, wherein the opposed sides are substantially parallel to each other such that the width of the roll-angle groove is constant between the opposed ends.

10. The projectile of claim 9, wherein the depth of the roll-angle groove further comprises a first depth at each of the opposed ends and a second depth at a center of the roll-angle groove.

11. The projectile of claim 10, wherein the second depth is greater than the first depth and the depth of the roll-angle groove increases from each of the opposed ends to the center.

12. The projectile of claim 11, wherein the increase in depth of the roll-angle groove is monotonic.

13. The projectile of claim 3, wherein the casing of the projectile is cylindrical at the location of the roll-angle groove.

14. The projectile of claim 3, wherein the length of the roll-angle groove is a complete thread along the outside of the casing that forms a thread groove.

15. A projectile comprising:
    a casing with a rear end, a front end, and a side wall extending between the rear and front ends; and
    a roll-angle groove for tracking the roll angle disposed on a cylindrical portion of the side wall of the casing, the roll-angle groove having a width, a depth, a first length, a pair of opposed sides and a pair of opposed ends, the width extending along a longitudinal axis of the projectile, the depth extending inwardly from an outer surface of the casing toward the longitudinal axis, and the first length extending along the outside of the casing in a plane that is substantially perpendicular to the longitudinal axis,
    a deflecting groove disposed on the side wall of the casing, the deflecting groove having a second length along the outside of the casing, the first length of the roll-angle groove and the second length of the deflecting groove being capable of forming a substantially closed loop along the outside of the casing, wherein the length of the deflecting groove is disposed in a plane that has an acute angle off the latitudinal axis of the projectile.

16. The projectile of claim 15, further comprising a sectional groove formed at a point at which the front end is fixedly coupled to the side wall, the deflecting groove being disposed between the rear end of the projectile and the sectional groove, wherein the deflecting groove deflects the return signal of the sectional groove to facilitate reducing the interference of the return signal of the roll-angle groove.

17. A projectile comprising:
  a casing with a rear end, a front end, and a side wall extending between the rear and front ends; and
  a roll-angle groove for tracking the roll angle of the projectile disposed on the side wall of the casing of the projectile, the roll-angle groove having a width, a depth, a length, a pair of opposed sides and a pair of opposed ends, the width extending along a longitudinal axis of the projectile, the depth extending inwardly from an outer surface of the casing toward the longitudinal axis, and the length extending along the outside of the casing configured substantially in the form of a thread groove substantially in a plane that is perpendicular to the longitudinal axis, wherein the opposed ends of the roll-angle groove are spaced apart a distance equal to $$\frac{\lambda}{4}(1+2n)$$

along the longitudinal axis of the projectile, where $\lambda$ is the wavelength of the transmitted radar signal and n is an integer.

18. A projectile comprising:
  a casing with a rear end, a front end, and a side wall extending between the rear and front ends; and
  a roll-angle groove for tracking the roll angle of the projectile disposed on the side wall of the casing of the projectile, the roll-angle groove having a width, a depth, a length, a pair of opposed sides and a pair of opposed ends, the width extending along a longitudinal axis of the projectile, the depth extending inwardly from an outer surface of the casing toward the longitudinal axis, and the length extending along the outside of the casing configured substantially in the form of a thread groove substantially in a plane that is perpendicular to the longitudinal axis, wherein the opposed ends of the roll-angle groove are spaced apart a distance equal to $$\frac{\lambda n}{2}\left(\frac{\theta}{2\pi}\right)^2$$

along the longitudinal axis of the projectile for $0 \leq \theta \leq 2\pi$, where $\theta$ is the roll angle in radians, $\lambda$ is the wavelength of the transmitted radar signal, and n is an integer.

19. A method of measuring an angle of roll of a projectile having a casing with a rear end, a front end, and a side wall therebetween, the method comprising:
  forming a roll-angle groove for tracking the roll angle of the projectile having a width, a depth, and a length on the side wall of the projectile, the width extending parallel to a longitudinal axis of the projectile, the depth extending inwardly from an exterior of the casing toward the longitudinal axis, and the length extending along the exterior of the casing perpendicularly to the width, the roll-angle groove having a pair of opposed sides and a pair of opposed ends;
  transmitting a polarized electromagnetic signal toward the projectile, the projectile having a radar signature that varies with the angle of roll of the projectile;
  receiving a return signal from the projectile, the return signal being modulated by at least a portion of the projectile on which the roll-angle groove is disposed; and
  processing the return signal to determine the effect of the roll-angle groove on the modulated return signal.

20. The method of claim 19, the forming step further comprising:
  forming a width of the roll-angle groove comprising a first width between opposed sides at each of the opposed ends and a second width between opposed sides at a center of the roll-angle groove;
  forming the second width to be greater than the first width such that the width of the roll-angle groove increases from each of the opposed ends to the center;
  forming one of the opposed sides to be substantially perpendicular to the longitudinal axis and the other of the opposed sides to be diagonal to the longitudinal axis such that the width of the roll-angle groove increases from each of the opposed ends to the center of the roll-angle groove; and
  forming the width of the groove to monotonically increase from each of the opposed ends to the center of the roll-angle groove.

21. The method of claim 19, wherein the length of the roll-angle groove comprises first and second halves, and the first half and the second half of the roll-angle groove are symmetrical.

22. The method of claim 19, the forming step further comprising:
  forming a first depth at each of the opposed ends and a second depth at a center of the roll-angle groove;
  forming the second depth to be greater than the first depth;
  forming the depth of the roll-angle groove to increase from each of the opposed ends to the center of the roll-angle groove;
  forming depth of the roll-angle groove to monotonically increase from the end of the opposed ends to the center of the roll-angle groove.

23. A method of measuring an angle of roll of a projectile having a casing with a rear end, a front end, and a side wall therebetween, the method comprising:
  forming a roll-angle groove on the side wall of the projectile for tracking the roll angle of the projectile, the roll-angle groove having a width, a depth, a length, a pair of opposed sides and a pair of opposed ends, the width extending parallel to a longitudinal axis of the projectile, the depth extending inwardly from an exterior of the casing toward the longitudinal axis, and the length extending perpendicularly to the width-having a first periphery along the outside of the casing;
  forming a sectional groove at a point at which the front end is coupled to the side wall;
  forming a deflecting groove that is disposed on the side wall of the casing between the rear-end of the projectile and the sectional groove, the deflecting groove having a length that has a second periphery along the outside of the casing located substantially in a plane that is diagonal to the longitudinal axis of the projectile, the first periphery of the roll-angle groove and the second periphery of the deflecting groove aligned in a substantially closed loop along the outside of the casing;
  transmitting a polarized electromagnetic signal toward the projectile, the projectile having a radar signature that varies with the angle of roll of the projectile;
  receiving a return signal from the projectile, the return signal being modulated by at least a portion of the projectile on which the roll-angle groove is disposed; and
  processing the return signal to determine the effect of the roll-angle groove on the modulated return signal.

24. A method of measuring an angle of roll of a projectile having a casing with a rear end, a front end, and a side wall therebetween, the method comprising:

forming a roll-angle groove as a continuous thread along the outside of the casing to form a thread groove; the roll-angle groove having a width, a depth, a length, a pair of opposed sides and a pair of opposed ends; the width extending parallel to a longitudinal axis of the projectile, the depth extending inwardly from an exterior of the casing toward the longitudinal axis, the length extending along the exterior substantially perpendicular to the width, and the opposed ends being spaced apart by a distance equal to $$\frac{\lambda}{4}(1+2n)$$

along the longitudinal axis of the projectile, where $\lambda$ is the wavelength of the transmitted radar signal and n is an integer;

transmitting a polarized electromagnetic signal toward the projectile, the projectile having a radar signature that varies with the angle of roll of the projectile;

receiving a return signal from the projectile, the return signal being modulated by at least a portion of the projectile on which the roll-angle groove is disposed; and processing the return signal to determine the effect of the roll-angle groove on the modulated return signal.

25. A method of measuring an angle of roll of a projectile having a casing with a rear end, a front end, and a side wall therebetween, the method comprising:

forming a roll-angle groove as a continuous thread along the outside of the casing to form a thread groove; the roll-angle groove having a width, a depth, a length, a pair of opposed sides and a pair of opposed ends; the width extending parallel to a longitudinal axis of the projectile, the depth extending inwardly from an exterior of the casing toward the longitudinal axis, the length extending along the exterior substantially perpendicular to the width, and the opposed ends being spaced apart by a distance equal to $$\frac{\lambda n}{2}\left(\frac{\theta}{\pi}\right)^2$$

along the longitudinal axis of the projectile, for $0 \leq \theta \leq 2\pi$, where $\theta$ is the roll angle in radians, $\lambda$ is the wavelength of the transmitted radar signal, and n is an integer;

transmitting a polarized electromagnetic signal toward the projectile, the projectile having a radar signature that varies with the angle of roll of the projectile;

receiving a return signal from the projectile, the return signal being modulated by at least a portion of the projectile on which the roll-angle groove is disposed; and processing the return signal to determine the effect of the roll-angle groove on the modulated return signal.

26. A system for the measurement of an angle of roll of a projectile, the system comprising:

a projectile having a casing with a rear end, a front end, and a side wall extending between the rear and front ends, the projectile further having a roll-angle groove for tracking the roll-angle of the projectile disposed on a cylindrical portion of the side wall of the casing, the roll-angle groove having a width, a depth, and a length, the width extending along a longitudinal axis of the projectile, the depth extending inwardly from an outer surface of the casing toward the longitudinal axis, and the length extending along the outside of the casing;

radar configured to transmit a polarized electromagnetic signal toward the projectile and to receive a return signal from the projectile, the return signal being modulated as a function of the angle of roll of the projectile; and processing means for analyzing the modulated return signal, the processing means determining the angle of roll by determining a modulating effect of the roll-angle groove on the return signal.

27. The system of claim 26, wherein the roll-angle groove further comprises a pair of opposed sides and a pair of opposed ends, wherein the depth of the roll-angle groove is constant, wherein the width of the roll-angle groove comprises a first width at each of the opposed ends and a second width at a center of the roll-angle groove, the second width being greater than the first width and the width of the roll-angle groove increasing from each of the opposed ends to the center.

28. The system of claim 26, wherein the opposed sides are substantially parallel to each other such that the width of the roll-angle groove is constant between the opposed ends, wherein the depth of the roll-angle groove has a first depth at each of the opposed ends and a second depth at the center of the roll-angle groove, the second depth being greater than the first depth and the depth of the roll-angle groove increasing from each of the opposed ends to the center.

29. A system for the measurement of an angle of roll of a projectile, the system comprising:

a projectile having a casing with a rear end, a front end, and a side wall extending between the rear and front ends, the projectile further having a roll-angle groove for tracking the roll angle of the projectile disposed on a cylindrical portion of the side wall of the casing, the roll-angle groove having a width, a depth, and a first length, the width extending along a longitudinal axis of the projectile, the depth extending inwardly from an outer surface of the casing toward the longitudinal axis, and the first length extending along the outside of the casing;

the projectile further comprises a deflecting groove disposed on the side wall of the casing, the deflecting groove having a second length along the outside of the casing, the first length of the roll-angle groove and the second length of the deflecting groove forming a substantially closed loop along the outside of the casing, wherein the deflecting groove extends substantially in a plane at an acute angle relative to the latitudinal axis of the projectile;

radar configured to transmit a polarized electromagnetic signal toward the projectile and to receive a return signal from the projectile, the return signal being modulated as a function of the angle of roll of the projectile; and processing means for analyzing the modulated return signal, the processing means determining the angle of roll by determining a modulating effect of the roll-angle groove on the return signal.

30. A system for the measurement of an angle of roll of a projectile, the system comprising:

a projectile having a casing with a rear end, a front end, and a side wall extending between the rear and front ends, the projectile further having a roll-angle groove is a continuous thread along the outside of a cylindrical portion of the side wall of the casing, the roll-angle groove having a width, a depth, and a length, the width extending along a longitudinal axis of the projectile, the depth extending inwardly from an outer surface of the casing toward the longitudinal axis, and the length extending along the outside of the casing, the opposed ends of the roll-angle groove having a distance between each other, the distance being $$\frac{\lambda}{4}(1+2n)$$

along the longitudinal axis of the projectile, where $\lambda$ is the wavelength of the transmitted radar signal and n is an integer;

radar configured to transmit a polarized electromagnetic signal toward the projectile and to receive a return signal from the projectile, the return signal being modulated as a function of the angle of roll of the projectile; and processing means for analyzing the modulated return signal, the processing means determining the angle of roll by determining a modulating effect of the roll-angle groove on the return signal.

31. A system for the measurement of an angle of roll of a projectile, the system comprising:

a projectile having a casing with a rear end, a front end, and a side wall extending between the rear and front ends, the projectile further having a roll-angle groove is a continuous thread along the outside of a cylindrical portion of the side wall of the casing, the roll-angle groove having a width, a depth, and a length, the width extending along a longitudinal axis of the projectile, the depth extending inwardly from an outer surface of the casing toward the longitudinal axis, and the length extending along the outside of the casing, the opposed ends of the roll-angle groove having a distance between each other, the distance being $$\frac{\lambda n}{2}\left(\frac{\theta}{\pi}\right)^2$$

along the longitudinal axis of the projectile for $0 \leq \theta \leq 2\pi$ where $\theta$ is the roll angle in radians $\lambda$ is the wavelength of the transmitted radar signal and n is an integer;

radar configured to transmit a polarized electromagnetic signal toward the projectile and to receive a return signal from the projectile, the return signal being modulated as a function of the angle of roll of the projectile; and processing means for analyzing the modulated return signal, the processing means determining the angle of roll by determining a modulating effect of the roll-angle groove on the return signal.

32. A projectile comprising a casing with a rear end, a front end, a side wall, and a thruster for changing the direction of the projectile, the side wall comprising means for tracking the roll rate and roll angle of the projectile, the means for tracking comprising means for reflecting an electromagnetic signal such that the amplitude or phase of the reflected electromagnetic signal varies as a function of the angular orientation of the projectile;

the thruster operating to steer the projectile to an intended target based upon the tracked roll angle and roll rate of the projectile.

33. The projectile of claim 32, wherein the means for reflecting an electromagnetic signal comprises a roll-angle groove.

\* \* \* \* \*